(12) United States Patent
Nakashima

(10) Patent No.: US 11,592,643 B2
(45) Date of Patent: Feb. 28, 2023

(54) IMAGE PICKUP APPARATUS EQUIPPED WITH ROTARY RING, OPTICAL DEVICE, AND ACCESSORY DEVICE

(71) Applicant: CANON KABUSHIKI KAISHA, Tokyo (JP)

(72) Inventor: Shinga Nakashima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 728 days.

(21) Appl. No.: 16/575,655

(22) Filed: Sep. 19, 2019

(65) Prior Publication Data

US 2020/0096725 A1 Mar. 26, 2020

(30) Foreign Application Priority Data

Sep. 21, 2018 (JP) .............................. JP2018-177491
Jul. 1, 2019 (JP) .............................. JP2019-123146

(51) Int. Cl.
  *G02B 7/02* (2021.01)
  *G03B 17/14* (2021.01)

(52) U.S. Cl.
  CPC .............. *G02B 7/026* (2013.01); *G03B 17/14* (2013.01)

(58) Field of Classification Search
  CPC .......... G02B 7/026; G02B 7/02; G03B 17/14; G03B 17/02; H04N 5/2254; G01D 5/34715; G01D 21/02
  USPC ..................................................... 348/222.1
  See application file for complete search history.

(56) References Cited

U.S. PATENT DOCUMENTS

| 8,488,018 | B2 * | 7/2013 | Maeda ................ G02B 27/646 |
| | | | 348/222.1 |
| 2018/0203329 | A1 * | 7/2018 | Takeshita ................ G03B 7/01 |
| 2020/0275013 | A1 * | 8/2020 | Yuan ...................... G03B 13/34 |
| 2021/0021765 | A1 * | 1/2021 | Watanabe ................ G02B 7/08 |

FOREIGN PATENT DOCUMENTS

| CN | 107121873 A | 9/2017 |
| CN | 108027490 A | 5/2018 |
| JP | 2011-039385 A | 2/2011 |

OTHER PUBLICATIONS

The above foreign documents were cited in a Oct. 20, 2021 Chinese Office Action, a copy of which is enclosed with an English Translation, that issued in Chinese Patent Application No. 201910880917.8.

\* cited by examiner

*Primary Examiner* — Lin Ye
*Assistant Examiner* — Chan T Nguyen
(74) *Attorney, Agent, or Firm* — Cowan, Liebowitz & Latman, P.C.

(57) ABSTRACT

An image pickup apparatus which is capable of stably detecting rotating operations of a rotary ring provided on an outer periphery of a lens barrel or the like. A holding member is provided on an inner periphery of the rotary ring to hold the rotary ring. A rotation detecting member detects a rotation direction and a rotation amount of the rotary ring when the rotary ring has been rotated. An urging member urges the rotary ring against the holding member in an urging direction perpendicular to a rotational axis of the rotary ring. A detecting direction of the rotation detecting member and the urging direction of the urging member are parallel to each other.

18 Claims, 10 Drawing Sheets

IMAGE PICKUP APPARATUS EQUIPPED WITH ROTARY RING, OPTICAL DEVICE, AND ACCESSORY DEVICE

BACKGROUND OF THE INVENTION

Field of the Invention

The present invention relates to an image pickup apparatus, an optical device, and an accessory device, and in particular to an image pickup apparatus equipped with a rotatable operating ring (rotary ring), an optical device, and an accessory device.

Description of the Related Art

In general, some image pickup apparatuses such as digital cameras and video cameras are equipped with a rotatable operating ring (rotary ring) provided on an outer periphery of a lens barrel or a lens adapter so as to adjust settings relating to shooting conditions such as focus, aperture, and zoom. What is called an optical encoder which detects rotating operations is sometimes used for this operating ring.

In the optical encoder, when the operating ring is rotated, a photo reflector or a photo interrupter which is a photo sensor is switched between an on state and an off state. For example, in a case where the photo reflector is used, the operating ring is equipped with alternately-formed reflective surfaces with different reflection factors. On the other hand, in a case where the photo interrupter is used, the operating ring is equipped with light shielding plates which shield light in response to rotating operations of the operating ring.

It should be noted that when the operating ring is rotated, the photo reflector or the photo interrupter is switched between the on state and the off state, and as a result, rotation of the operating ring and the amount of the rotation are detected. In response to rotating operations of the operating ring, a variety of parameters for shooting are changed.

The operating ring described above needs a clearance from peripheral components so as to rotate smoothly, and this clearance causes some rattles. Rattles of operating rings caused by gaps between components may vary due to variations in tolerances of components, holding mechanisms, and assembly. As a result, during detection using the optical encoder, numeric values such as detection timing and the amount of rotation may be unstable because they vary with individual operating rings.

To address this problem, for example, a method that detects an on state and an off state of an optical encoder (for example, a photo interrupter) in response to rotation of an annular ring rotating with an operating ring has been proposed (Japanese Laid-Open Patent Publication (Kokai) No. 2011-39385). According to Japanese Laid-Open Patent Publication (Kokai) No. 2011-39385, holes which a ball for providing a click feel fit into are formed at regular intervals all around the entire circumference of the operating ring. Furthermore, according to Japanese Laid-Open Patent Publication (Kokai) No. 2011-39385, the ball and the photo interrupter are placed within an angle of 90 degrees with the center of a predetermined circle being an axis.

Thus, according to Japanese Laid-Open Patent Publication (Kokai) No. 2011-39385, when a rattle occurs, the annular ring in which the holes for sensing are formed is displaced in a rotation direction with the ball being an axis. Therefore, if the ball and the photo interrupter are placed within the angle of 90 degrees, the photo interrupter can be placed at such a position that the amount of displacement is relatively small.

As described above, according to Japanese Laid-Open Patent Publication (Kokai) No. 2011-39385, although the photo interrupter is placed at a position where the amount of displacement is small, its position varies depending on the amount of rattle of the operating ring.

Moreover, when the operating ring is rotated, results of detection using the photo interrupter vary depending on a direction in which a strong force to rotate the operating ring acts, and hence stable detection is difficult. Furthermore, detection errors are unavoidable due to displacement of the click mechanism as well.

SUMMARY OF THE INVENTION

The present invention provides an image pickup apparatus, an optical device, and an accessory device which are capable of stably detecting rotating operations of a rotary ring provided on an outer periphery of a lens barrel or the like.

Accordingly, the present invention provides an image pickup apparatus that includes a rotary ring being provided on an outer periphery of a lens barrel; a holding member being provided on an inner periphery of the rotary ring and holding the rotary ring; a rotation detecting member detecting a rotation direction and a rotation amount of the rotary ring when the rotary ring has been rotated; and an urging member urging the rotary ring against the holding member in an urging direction perpendicular to a rotational axis of the rotary ring, wherein a detecting direction of the rotation detecting member and the urging direction of the urging member are parallel to each other.

In another aspect, the present invention provides an optical device that includes a lens barrel being detachably attachable from an image pickup apparatus; a rotary ring being provided on an outer periphery of the lens barrel; a holding member being provided on an inner periphery of the rotary ring and holding the rotary ring; a rotation detecting member detecting a rotation direction and a rotation amount of the rotary ring when the rotary ring has been rotated; and an urging member urging the rotary ring against the holding member in an urging direction perpendicular to a rotational axis of the rotary ring, wherein a detecting direction of the rotation detecting member and the urging direction of the urging member are parallel to each other.

In another aspect, the present invention provides An accessory device that includes a lens adapter being detachably attachable from an image pickup apparatus and on which a lens barrel is mountable; a rotary ring being provided on an outer periphery of the lens adapter; a holding member being provided on an inner periphery of the rotary ring and holding the rotary ring; a rotation detecting member detecting a rotation direction and a rotation amount of the rotary ring when the rotary ring has been rotated; and an urging member urging the rotary ring against the holding member in an urging direction perpendicular to a rotational axis of the rotary ring, wherein a detecting direction of the rotation detecting member and the urging direction of the urging member are parallel to each other.

According to the present invention, rotating operations of a rotary ring provided on an outer periphery of a lens barrel or the like are stably detected.

Further features of the present invention will become apparent from the following description of exemplary embodiments (with reference to the attached drawings).

DESCRIPTION OF THE EMBODIMENTS

Examples of image pickup apparatuses equipped with lens barrels according to embodiments of the present invention will now be described with reference to the drawings.

Figure 1:
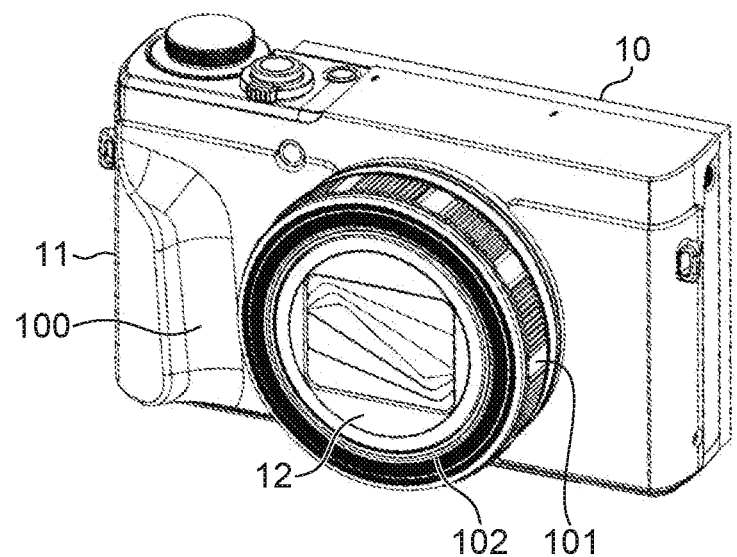
FIG. 1 is a front perspective view showing an appearance of an example of an image pickup apparatus equipped with a lens barrel according to a first embodiment of the present invention.

FIG. 1 is a front perspective view showing an appearance of an example of an image pickup apparatus equipped with a lens barrel according to a first embodiment of the present invention.

The illustrated image pickup apparatus is, for example, a digital camera (hereafter referred to merely as the camera) 10, and a lens barrel 12 equipped with a taking lens is integrated with a camera main body. It should be noted that as with, for example, a third embodiment which will be described later, the lens barrel 12 of the camera 10 may be detachably attachable from the camera main body.

The camera 10 has a front cover unit 11 on a front side thereof. The camera 10 is equipped with the lens barrel 12 which forms an optical image on an image pickup device (not shown), and an operating ring (rotational member, rotary ring) 101 provided for the front cover unit 11 is placed on an outer periphery of the lens barrel 12. Namely, the camera 10 has the image pickup device that generates an image corresponding to an optical image formed thereon through the lens barrel 12.

The lens barrel 12 is molded in a cylindrical shape, and on an inner peripheral side of the operating ring 101, a hollow portion is formed all around the outer periphery of the lens barrel 12. The operating ring 101 is held between a fixing member 102 and a front cover (holding member) 100.

A photographer can assign an arbitrary function for changing shooting conditions to the operating ring 101. For example, the photographer can change shooting conditions such as a focal position and an exposure value by rotating the operating ring 101.

Figure 2:
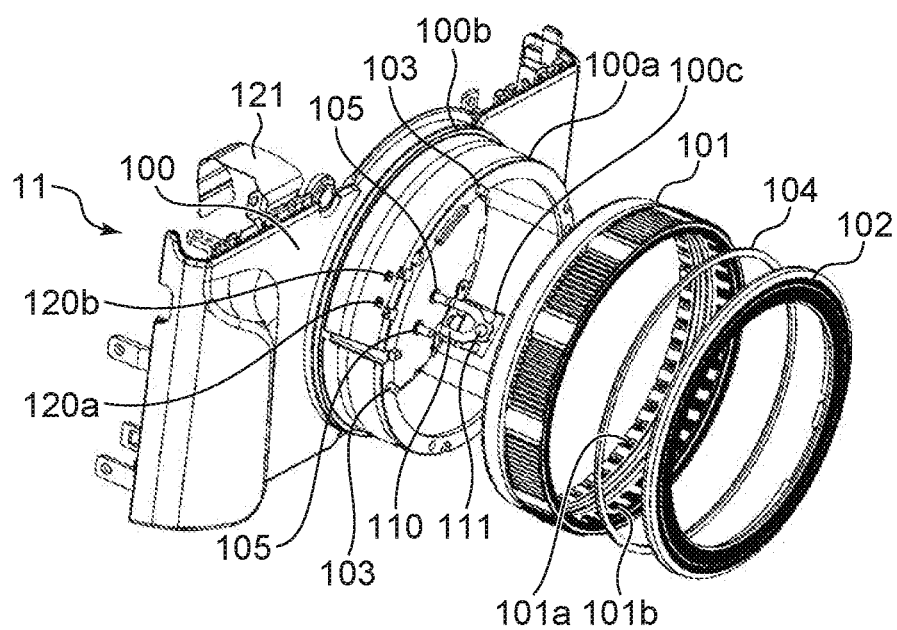
FIG. 2 is an exploded perspective view showing a front cover unit in FIG. 1 as well as the lens barrel.

FIG. 2 is an exploded perspective view showing the front cover unit 11 in FIG. 1 as well as the lens barrel 12.

The front cover unit 11 has the front cover 100 in two colors which has its inner side thereof (main body side) formed of a hard resin such as polycarbonate and its exterior side thereof formed of an elastic resin with high grip. The operating ring 101, which is formed by cutting an aluminum material, has its outer periphery formed in an uneven shape and its outer peripheral surface finished rough by a blasting process. This improves the ease of operation since fingers are less likely to slip when rotating the operating ring 101.

The operating ring 101 is provided for the front cover 100 and is held in a state of being rotatably fitted on an outer peripheral portion of a cylindrical portion 100a corresponding to the outer periphery of the lens barrel 12. The cylindrical portion 100a of the front cover 100 is provided on the inner peripheral side of the operating ring 101. The operating ring 101 is rotatably sandwiched between the fixing member 102, which is placed at a front end of the front cover unit 11, and a front cover fixing portion 100b.

As described above, the operating ring 101 is formed by cutting an aluminum material. As a result, the operating ring 101 resists being deformed when it is held during operation and also has high dimensional accuracy, and therefore, the operating ring 101 is able to slide while being kept in contact with the cylindrical portion 100a. Moreover, even when the operating ring 101 is thinned, it is unlikely to be deformed because its stiffness is maintained.

A part of the cylindrical portion 100a is cut, and photo sensors (detecting units, rotation sensing members) 120a and 120b are placed in a manner being exposed from the cut. These photo sensors 120a and 120b are fixed to a flexible wiring board 121, which will be described later. The flexible wiring board 121 is fixed by a holding sheet metal 122, which will be described later.

A pattern (detected portion, rotation detecting pattern) 101b, which has alternating reflective areas and non-reflective areas, is formed in an inner diameter portion of the operating ring 101. The reflective areas reflect light, which is reflected from the photo sensors 120a and 120b, at detectable levels, and the non-reflective areas do not reflect light reflected from the photo sensors 120a and 120b.

The fixing member 102 is fastened to and held at a front end of the cylindrical portion 100a by fixing member fixing screws 103. A sliding sheet 104 is attached to a groove portion (not shown), which extends in a circumferential direction of the fixing member 102, by a double-faced tape (not shown). The sliding sheet 104 is formed of an elastic member to have a cushioning capability.

This prevents the operating ring 101 from rattling in a direction of a rotational axis (thrust direction). A sheet member is used for a surface of the sliding sheet 104, which is in contact with the operating ring 101, so that the sliding sheet 104 can slide in a satisfactory manner.

An urging metal sheet (urging member) 110 is fixed to the front cover 100 by metal sheet fixing screws 105. The urging metal sheet 110 is formed of a material with springiness such as stainless steel, phosphor bronze, or titanium copper. In the front cover 100, an opening 110a, which will be described later, is formed at a front end of the urging metal sheet 110, and a steel ball 111 is engaged with the opening 110a.

The urging metal sheet 110 is placed inside a cut 100c formed by cutting a part of the cylindrical portion 100a. The steel ball 111 is placed in a through portion 100d formed in the cylindrical portion 100a, which will be described later, and exposes itself from the cylindrical portion 100a. A number of groove portions are formed all around the entire circumference of an inner peripheral portion of the operating ring 101.

The urging metal sheet 110 urges the steel ball 111 against the operating ring 101 in a direction perpendicular to (intersecting) a direction of an optical axis of the lens barrel 12. In the through portion 100d formed in the cylindrical portion 100a, the steel ball 111 abuts against a groove portion 101a formed on the operating ring 101. Namely, the steel ball 111 is urged by the urging metal sheet 110 to abut against the groove portion 101a formed on the operating ring 101.

Thus, when the rotatably-held operating ring 101 is rotated, the steel ball 111 repeatedly climbs over one of the groove portions 101a and abuts against the adjacent one of the groove portions 101a. This implements a click mechanism that provides a click feel.

The urging metal sheet 110 and the steel ball 111 are located outside the lens barrel 12 and interposed between the lens barrel 12 and the operating ring 101. The urging metal sheet 110 urges the steel ball 111 against the operating ring 101 outward along the optical axis of the lens barrel 12, namely, outward from the inside of the camera.

Since the grooves are formed in the inner peripheral portion of the operating ring 101, and the steel ball 111 is urged outward by the urging metal sheet 110, the grooves constituting the click mechanism are not seen from outside, and hence the appearance is not compromised. Moreover, since the urging metal sheet 110 is placed inside the cut 100c formed in the cylindrical portion 100a, and the grooves 101a are formed on the operating ring 101, space can be saved without the camera itself being upsized because of the click mechanism.

Figure 3:
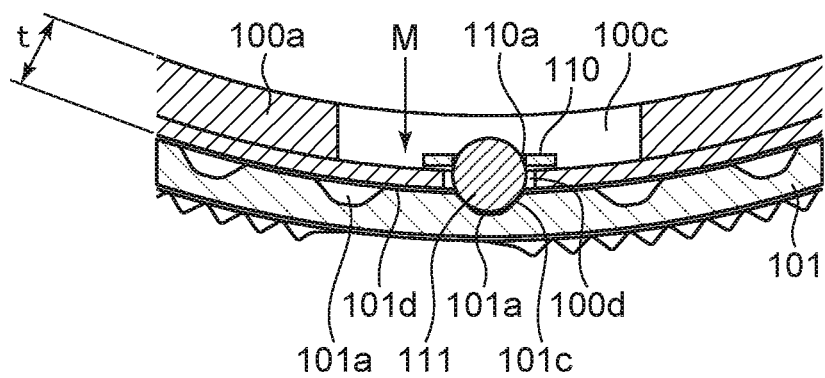
FIG. 3 is a view useful in explaining an arrangement of a click mechanism provided in the front cover unit in FIG. 1.

FIG. 3 is a view useful in explaining an arrangement of the click mechanism provided in the front cover unit 11 in FIG. 1.

The click mechanism is comprised of the urging metal sheet 110, the steel ball 111, and the groove portions (grooves) 101a. As described earlier, the urging metal sheet 110 is fastened to the front cover 100 by the metal sheet fixing screws 105, and the steel ball 111 is engaged with the urging metal sheet 110.

The urging metal sheet 110 has springiness, and in the vicinity of its front end, the round opening 110a is formed. The steel ball 111 is engaged with the opening 110a and urged in a direction indicated by an arrow M in FIG. 3.

The plurality of groove portions 101a is formed on an inner surface of the operating ring 101, that is, a surface of the operating ring 101 which is close to the cylindrical portion 100a. The groove portions 101a are formed at regular intervals on a 360° inner periphery of the operating ring 101. The urging metal sheet 110 and the steel ball 111 are placed in the cut 100c formed on an inner side of the cylindrical portion 100a which is the lens barrel 12 side.

Thus, the urging metal sheet 110 and the steel ball 111, which are components of the click mechanism, are housed in a portion of the cylindrical portion 100a which has a thickness t. Also, the groove portions 101a are formed on the inner peripheral surface of the operating ring 101, and therefore, space can be saved without the camera itself upsizing due to the layout of the click mechanism.

A part of the cut 100c formed in the cylindrical portion 100a is configured as the through portion 100d, and the steel ball 111 is exposed to the operating ring 101 side through the through portion 100d. Each of the groove portions 101a has a side face thereof inclined to form a side face inclined portion 101c, and in a stationary state, the steel ball 111 is caused to abut against the groove portion 101a by an urging force of the urging metal sheet 110. Thus, the steel ball 111 abuts against the side face inclined portion 101c.

When the operating ring 101 is rotated, the steel ball 111 moves out of the groove portion 101a along the side face inclined portion 101c and climbs over a sliding portion 101d, which is located between the groove portion 101a against which the steel ball 111 has abutted and another groove portion 101a adjacent to it. When the operating ring 101 is further rotated, the steel ball 111 fits into this adjacent groove portion 101a, causing the photographer to feel a click.

Although according to the above description, the groove portions 101a and the steel ball 11 constituting the click mechanism abut against each other, the present embodiment is not limited to this. For example, a resin pin with an R-shaped portion abutting against the groove portions 101a may be used in place of the steel ball 111. Alternatively, the urging metal sheet 110 may have an R-shaped portion, which abuts against the groove portions 101a.

As described above, the groove portions 101a are formed at regular intervals in the inner peripheral portion of the operating ring 101, and the urging metal sheet 110 and the steel ball 111 are provided in the front cover 100 to constitute the click mechanism. This eliminates the need to provide the click mechanism all around the entire circumference of the lens barrel 12 and thus saves space without upsizing the camera itself.

Figure 4A:
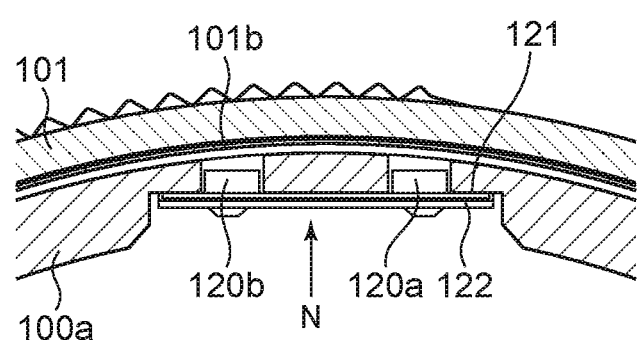
FIGS. 4A and 4B are views useful in explaining the placement of photo sensors in FIG. 2.
Figure 4B:
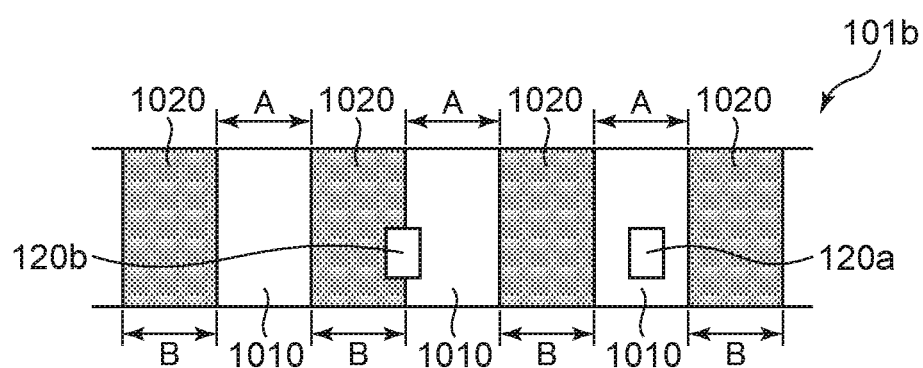

FIGS. 4A and 4B are views useful in explaining the placement of the photo sensors in FIG. 2. FIG. 4A is a cross-sectional view schematically showing the photo sensors, and FIG. 4B is a cross-sectional view schematically showing the placement of the photo sensors and the pattern.

In the present embodiment, sensing means (rotation detecting members) for sensing rotation of the operating ring 101 are reflective photo sensors (photo reflectors) each comprised of a light-emitting element (light transmitter) and a light-receiving element (light receiver) which are placed side by side on a plane. The sensing means senses reflection of light emitted toward the pattern 101b provided on the inner peripheral surface of the operating ring 101.

It should be noted that the photo sensors should not necessarily have the above arrangement. For example, translucent photo interrupters which sense light by means of light-shielding members (to be described later) provided in the inner peripheral portion of the operating ring 101 may be used.

As shown in FIG. 4A, the photo sensor 120a and the photo sensor 120b are mounted on the flexible wiring board 121. The photo sensor 120a and the photo sensor 120b are placed inner peripheral side of the operating ring 101 and faces outward from a central axis of the operating ring 101. The flexible wiring board 121 is held by a holding metal sheet 122.

The holding metal sheet 122 is fixed to the front cover 100 by screws (not shown). As described earlier, the pattern 101b with the alternating reflective areas and non-reflective areas is formed on the inner peripheral surface of the operating ring 101. The pattern 101 is located in opposed relation to the photo sensor 120a and the photo sensor 120b.

As shown in FIG. 4B, the pattern 101b has the reflective areas 1010, which are glossed by cutting an aluminum material, and the non-reflective areas 1020, which are coated to have no gloss. The reflective areas 1010 and the non-reflective areas 1020 are arranged regularly (for example, alternately) with equal widths.

Thus, with rotation of the operating ring 101, the light-receiving units of the photo sensor 120a and the photo sensor 120b are alternately brought into a light-receiving state and a non-light-receiving state, and detection signals output from the light-receiving units are sent to a signal processing circuit (not shown).

Referring to FIG. 4B, the photo sensor 120a and the photo sensor 120b are placed such that when the photo sensor 120a lies at substantially the center of the reflective area 1010, the photo sensor 120b substantially lies on the border between the reflective area 1010 and the non-reflective area 1020. This layout maximizes a phase difference between detection signals output from the photo sensor 120a and the photo sensor 120b when the operating ring 101 is rotated. With this arrangement, a change in phase difference is recognized.

To detect a rotation direction, it is necessary to obtain a phase difference between two detection signals. Because of the phase difference, whether or not the photo sensor 120b receives light when the photo sensor 120a receives light differs according to a rotation direction of the operating ring 101. Based on this difference, the signal processing circuit is able to determine a direction in which the operating ring 101 is rotating.

Figure 5:
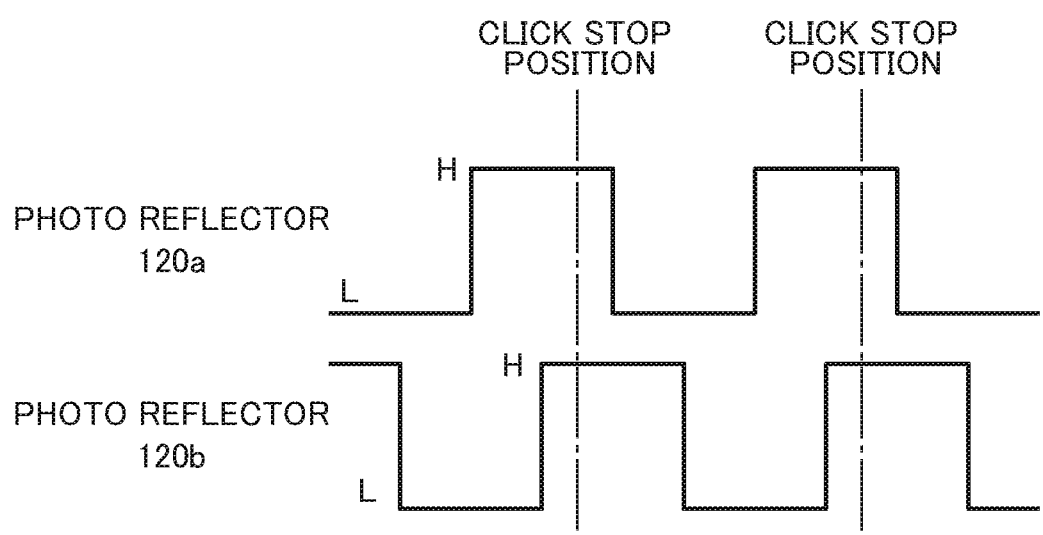
FIG. 5 is a view showing examples of detection signal waveforms which are output from the photo sensors when an operating ring in FIG. 2 is rotated.

FIG. 5 is a view showing examples of detection signal waveforms output from the photo sensors 120a and 120b when the operating ring in FIG. 2 is rotated.

FIG. 5 shows detection signal waveforms output from the photo sensors 120a and 120b when the operating ring 101 is rotated. Here, a range where the detection signal is at a high level (H) represents a light-receiving state, and a range where the detection signal is at a low level (L) represents a non-light-receiving state. In FIG. 5, the detection signal waveforms output from the photo sensors 120a and 120b have a phase difference of substantially a half phase.

In the illustrated example, when the operating ring 101 has been rotated, and the photo sensor 120b has received light, this means that the operating ring 101 has been rotated clockwise unless the photo sensor 120a has received light. On the other hand, when the photo sensor 120b has received light, this means that the operating ring 101 has been rotated clockwise if the photo sensor 120a has received light.

When there is no phase difference between the detection signal waveforms from the photo sensor 120a and the photo sensor 120b, the detection signal waveforms from the photo sensor 120a and the photo sensor 120b remain the same irrespective of the direction in which the operating ring 101 is rotated. As a result, a rotation direction of the operating ring 101 cannot be detected.

When there is only a little difference between the detection signal waveforms from the photo sensor 120a and the photo sensor 120b, the phase difference varies, causing misdetection of a rotation direction of the operating ring 101. Also, when the distance between the photo sensor 120a and the photo sensor 120b and the pattern 101b is not constant and not stable, the detection signal waveforms may vary, causing the misdetection as well.

When the detection signal waveform from the photo sensor 120b changes from L to H, the signal processing circuit determines that the operating ring 101 has rotated one pitch when detecting its rotational amount. As described earlier, the alternating reflective areas 1010 and non-reflective areas 1020 are formed at regular intervals of the same pitch all around the entire circumference of the inner peripheral surface of the operating ring 101. Namely, whenever the operating ring 101 is rotated one pitch, a rotation of the operating ring 101 is detected.

When the operating ring 101 is in a click position where the steel ball 111 abuts against the groove portion 101a, the photo sensors 120a and 120b and the pattern 101b have a positional relationship shown in FIG. 5. Namely, when the operating ring 101 is not rotating in the click position where the steel ball 111 abuts against the groove portion 101a, the photo sensors 120a and 120b and the pattern 101b have such a positional relationship that the detection signal waveforms are in the H range.

The number of click positions corresponds to the number of groove portions 101a formed in the operating ring 101 at regular intervals around the 360-degree periphery of the operating ring 101. Thus, the photo sensors 120a and 120b and the pattern 101b are placed such that whenever the operating ring 101 comes to a click position, the positional relationship between the photo sensors 120a and 120b and the pattern 101b changes from the one in FIG. 4B to a click stop position in FIG. 5.

The photo sensors 120a and 120b are placed with respect to the pattern 101b such that their detecting direction is a direction indicated by an arrow N in FIG. 4A, and they are fixed vertically to the flexible wiring board 121.

Figure 6A:
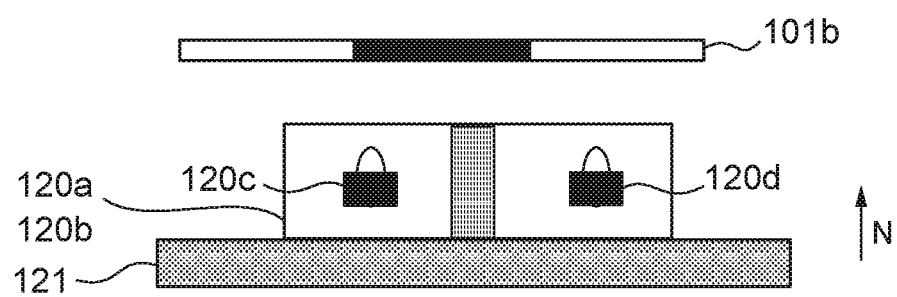
FIGS. 6A and 6B are views useful in explaining the placement of the photo sensors and their detecting directions.
Figure 6B:
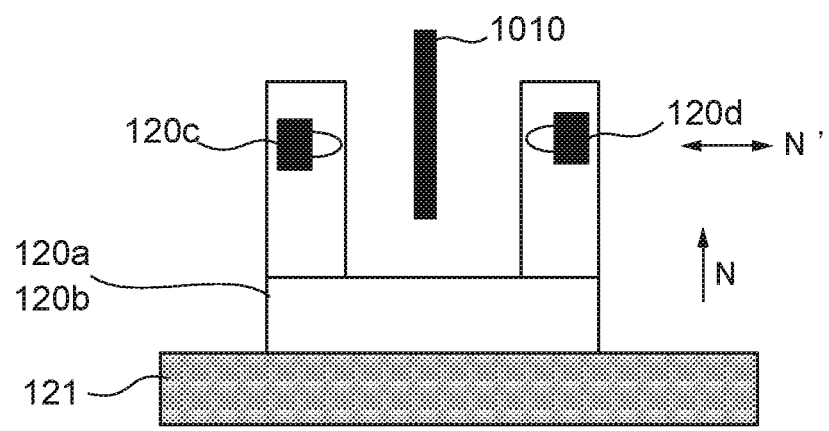

Next, a referring to FIGS. 6A and 6B, a detailed description will be given of the placement and detecting direction of the photo sensors 120a and 120b. FIGS. 6A and 6B are schematic structural diagrams showing an internal structure of the photo sensors 120a and 120b which are reflective photo sensors (photo reflectors) according to the present embodiment.

The photo sensors 120a and 120b according to the present embodiment are sensing means for sensing rotation of the operating ring 101, and they are reflective photo sensors each of which has therein a light-emitting device (light transmitter) 120c and a light-receiving device (light receiver) 120d which are placed side by side on a plane. The photo sensors 120a and 120b detect reflection of a light bundle emitted toward the pattern 101b provided on the inner peripheral surface of the operating ring 101.

The photo sensors 120a and 120b are mounted on a flat surface of the flexible wiring board 121 as shown in FIGS. 6A and 6B. The light-emitting device 120c and the light-receiving device 120d are placed inside the photo sensors 120a and 120b as shown in FIGS. 6A and 6B. The light-emitting device 120c emits (outputs) infrared light such as infrared LEDs.

In the photo sensors 120a and 120b, the light-emitting device 120c is placed such that infrared light is emitted toward a surface opposite to a surface of the photo sensors 120a and 120b which is mounted on the flexible wiring board 121. Namely, the light-emitting device 120c is placed so as to emit infrared light toward the pattern 101b for sensing rotation of the operating ring 101. This direction is vertical to the mounting surface of the photo sensors 120a and 120b and is a direction indicated by an arrow N.

When the light-emitting device 120c emits infrared light, the infrared light is reflected by the white areas 1010 of the pattern 101b shown in FIGS. 4A and 4B, and the reflected light falls upon the light-receiving device 120d. It should be noted that the infrared light emitted from the light-emitting device 120c to the black areas 1020 is absorbed by the black regions 1020 and thus not reflected.

The pattern 101b has the black areas 1020 on which infrared light is not reflected and the white areas 1010 on which infrared light is reflected, and hence when the operating ring 101 is rotated, there are areas on which infrared light is reflected and areas on which infrared light is not reflected. Based on this characteristic, detection signals described earlier with reference to FIG. 5 are output, and whether they are at the high level (H) or the low level (L) is determined.

It should be noted that the photo sensors are not limited to the reflective photo sensors (photo reflectors) described above. For example, translucent photo interrupters which sense light using light-shielding members (to be described later) provided in the inner peripheral portion of the operating ring 101 may be used as the sensing means.

FIG. 6B is a schematic structural diagram showing an internal structure of the photo sensors 120a and 120b which are sensing means using a translucent photo interrupter which is another example according to the present embodiment. According to an arrangement of the present example using the photo interrupter, light-shielding plates 1010 are radially placed in the inner peripheral portion of the operating ring 101 (not shown).

The photo sensors 120a and 120b are sensing means for sensing rotation of the operating ring 101 and have the light-emitting device 120c and the light-receiving device 120d which are placed in a manner facing each other. The light-receiving device 120d receives light emitted from the light-emitting device 120c. Light passing between the light-emitting device 120c and the light-receiving device 120d is shielded by light-shielding objects to detect an on state and an off state.

The light-shielding plates 1010, which are the light-shielding objects, are placed in the form of a toothed comb in the inner peripheral portion of the operating ring 101. When the operating ring 101 is rotated, light passing between the light-emitting device 120c and the light-receiving device 120d is shielded and not shielded alternately by the light-shielding plate 1010, and as a result, rotation of the operating ring 101 is detected.

In the photo sensors 120a and 120b in this example using the photo interrupters as sensors, a direction perpendicular to a surface of the flexible wiring board 121 on which the photo interrupters are mounted is a detecting direction N. It should be noted that the detecting direction of the photo interrupters is not limited to this example, and a direction in which the light-emitting device 120c or the light-receiving device 120d faces may be a detecting direction N'.

In the present embodiment, a sensing method using the photo sensors 120a and 120b to detect rotation is adopted. However, a sensing method using a contact pattern which outputs a signal upon a brush-shaped metallic plate spring coming into contact with a flexible wiring board or a sensing method using a magnetic sensor may be adopted. According to the sensing method using the metallic plate spring, a direction in which the metallic plate spring is urged can be a detecting direction, and according to the sensing method using the magnetic sensor, a direction of a minimum distance between a detecting unit such as a Hall effect device and a magnet placed on a rotary member can be a detecting direction.

Figure 7:
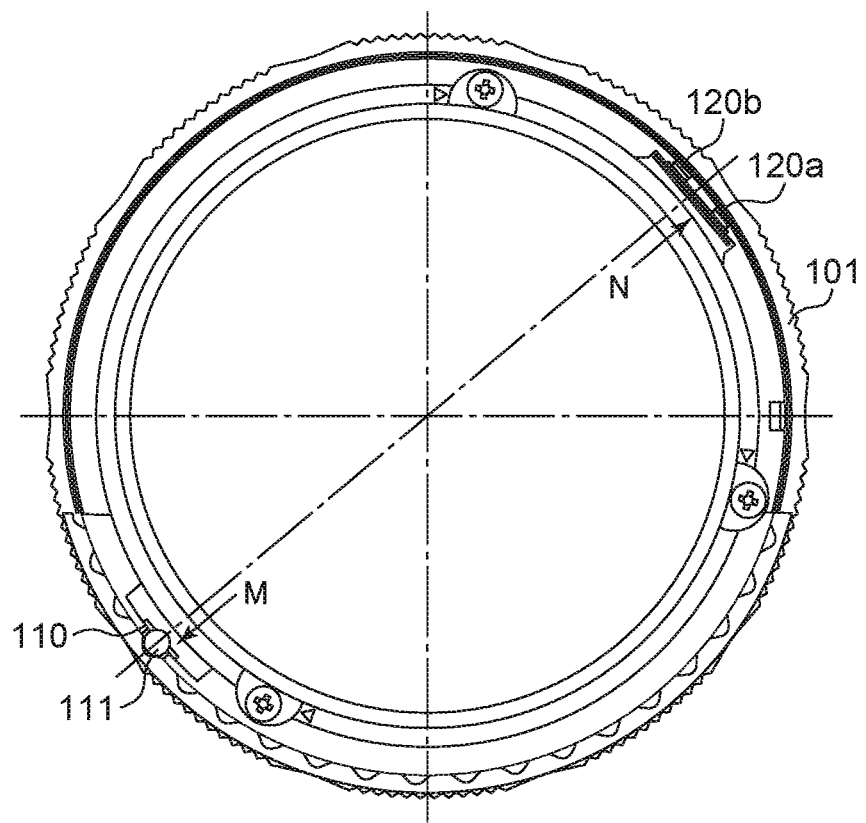
FIG. 7 is a view useful in explaining the positional relationship between the photo sensors in FIGS. 4A and 4B and the click mechanism.

FIG. 7 is a view useful in explaining the positional relationship between the photo sensors and the click mechanism in FIGS. 4A and 4B.

The photo sensors 120a and 120b and the click mechanism with the steel ball 111 are placed substantially symmetric with respect to the rotational axis of the operating ring 101. An urging direction M in which the urging metal sheet 110 urges the steel ball 111 against the groove portions 101a is substantially parallel to a direction N that is the detecting direction of the photo sensors 120a and 120b.

As described earlier, the urging metal sheet 110 has springiness. The urging metal sheet 110 urges the operating ring 101, which has the groove portions 101a, in the urging direction M via the steel ball 111. Namely, the urging metal sheet 110 and the steel ball 111 constitute an urging member for urging the operating ring 101. The operating ring 101 fits on the cylindrical portion 100a provided in the front cover 100. Here, the cylindrical portion 100a is a component formed of resin, and the operating ring 101 is a component cut from an aluminum material.

The cylindrical portion 100a and the operating ring 101 slide in contact with each other, and hence a sliding resistance increases due to a difference in thermal contraction caused by temperature change. Thus, to prevent the operability of the operating ring 101 from becoming worse, a clearance is provided between the cylindrical portion 100a and the operating ring 101.

Figure 8:
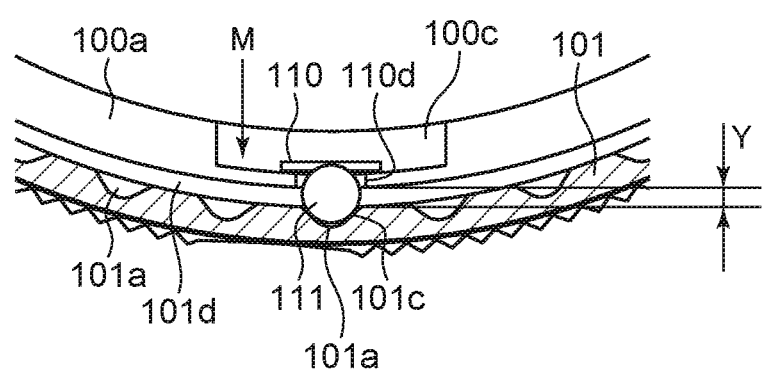
FIG. 8 is a view showing an example of a state in which the operating ring in FIG. 7 leans to one side.

FIG. 8 is a view showing an example of a state in which the operating ring in FIG. 7 leans to one side.

A number of components that hold and fix the cylindrical portion 100a and the operating ring 101 are placed around them, and hence there are tolerances and clearances of the components. Thus, as shown in FIG. 8, there is a gap Y between the operating ring 101 and the cylindrical portion 100a which fits on and holds the operating ring 101. This gap Y is formed all around the entire inner circumference of the operating ring 101. On the other hand, since the urging metal sheet 110 urges the operating ring 101 in the urging direction M via the steel ball 111, the operating ring 101 always leans toward the click mechanism side (that is, in the urging direction M) without a rattle corresponding to the gap Y occurring in the operating ring 101 all around its entire circumference.

As described earlier, the photo sensors 120a and 120b and the click mechanism with the steel ball 111 are placed substantially symmetric with respect to the rotational axis of the operating ring 101. The detecting direction N of the photo sensors 120a and 120b in FIG. 4A and the urging direction M of the urging metal sheet 110 in FIG. 3 are substantially parallel to each other.

Therefore, even if a gap is formed between the cylindrical portion 100a and the operating ring 101, the operating ring 101 leans to one side toward the click mechanism (that is, in the urging direction M) which has the urging metal sheet 110 by urging force of the urging metal sheet 110. For this reason, the distance between the operating ring 101, which is located on the photo sensors 120a and 120b side, and the cylindrical portion 100a is maintained constant without a gap being formed between them. Namely, the distance between the photo sensors 120a and 120b fixed to the front cover 100 and the pattern 101b formed in the operating ring 101 is maintained constant.

According to the arrangement described above, stable detection using the photo sensors 120a and 120b is possible even if a clearance is provided between the operating ring 101 and the cylindrical portion 100a, and gaps vary with components due to variations in molding.

Thus, according to the first embodiment of the present invention, rotating operations of the operating ring (rotary ring) provided on the outer periphery of the lens barrel are stably detected.

A description will now be given of a camera according to a second embodiment of the present invention. The camera according to the second embodiment and the camera according to the first embodiment differ in their operating rings and structures that urge them, but otherwise they are identical. In the first embodiment, when the operating ring 101 is rotated, the click mechanism provides a click feel. On the other hand, in the arrangement according to the second embodiment, when the operating ring 101 is rotated, no click feel is provided.

Figure 9:
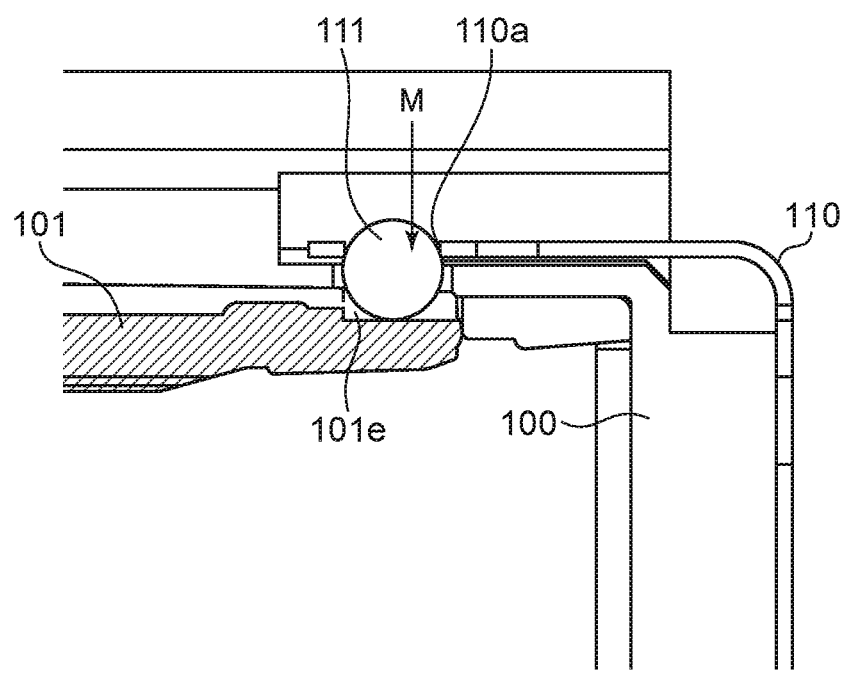
FIG. 9 is a view useful in explaining an example of an operating ring for use in a lens barrel according to a second embodiment of the present invention.

FIG. 9 is a view useful in explaining an example of the operating ring for use in the camera equipped with a lens barrel according to the second embodiment of the present invention.

In the illustrated example, the urging metal sheet 110 has springiness, and the round opening 110a is formed near an end of the urging metal sheet 110. The steel ball 111 is engaged with the opening 110a and urged in a direction indicated by an arrow M in the figure.

A grounded portion 101e is formed on the inner peripheral side of the operating ring 101, that is, on the surface of the operating unit 101 which is close to the cylindrical portion 100a. The grounded portion 101a is formed around the inner periphery of and concentrically with the operating ring 101.

A surface of the steel ball 111 which abuts against the operating ring 101 has a circular shape concentric with the operating ring 101, and hence when the operating ring 101 is rotated, the operating ring 101 smoothly rotates without providing a click feel.

The steel ball 111 is always in contact with the grounded portion 101e when the operating ring 101 is rotated, and the operating ring 101 is urged in the direction M by an urging force of the urging metal sheet 110 via the steel ball 111. When the operating ring 101 is rotated, the grounded portion 101e formed on the operating ring 101 rotates in contact with the steel ball 111, and accordingly, the grounded portion 101e is subjected to machining with low frictional resistance such as mirror machining. As a result, when the operating ring 101 is rotated, the photographer does not feel graininess or feel snagged.

In the second embodiment, the operating ring 101 is fitted on the cylindrical portion 100a. The cylindrical portion 10a is a component formed of resin, and the operating ring 101 is a component cut from an aluminum material. Since the operating ring 101 slides in contact with the cylindrical portion 100a as described above, it is necessary to prevent operability from becoming worse because of an increase in sliding resistance due to variations in thermal contraction caused by temperature changes. Accordingly, a clearance is provided between the cylindrical portion 100a and the operating ring 101.

Furthermore, a number of components that hold and fix the cylindrical portion 100a and the operating ring 101 are placed around them, and hence there are tolerances and clearances of the components. Thus, as described above with reference to FIG. 8, a gap Y is formed between the operating ring 101 and the cylindrical portion 100a. This gap Y is formed all around the entire inner circumference of the cylindrical portion 100a and the operating ring 101. On the other hand, since the urging metal sheet 110 urges the operating ring 101 in the urging direction M via the steel ball 111, the operating ring 101 always leans to one side toward the urging mechanism equipped with the urging metal sheet 110 without a rattle corresponding to the gap Y occurring in the operating ring 101 all around its entire circumference.

The urging metal sheet 110 and the photo sensors 120a and 120b are placed substantially symmetrical with respect to the rotational axis of the operating ring 101. The urging direction of the urging metal sheet 110 is substantially parallel to the detecting direction N of the photo sensors 120a and 120b shown in FIG. 4A.

The urging force of the urging metal sheet 110 leans the operating ring 101 to one side toward the urging metal sheet 110. The distance between the photo sensors 120a and 120b, which are placed substantially symmetrical with respect to the rotational axis of the operating ring 101, and the operating ring 101, that is, the pattern 101b is constant. For this reason, even if a clearance is provided between the operating ring 101 and the cylindrical portion 100a, and gaps vary due to dimensions of components differing because of variations in components, the photo sensors 120a and 120b are able to stably detect rotation.

Although in the second embodiment, the operating ring 101 is held so as to be rotatable only in the rotation direction, the present embodiment is not limited to this. For example, the groove portions 101a of the first embodiment described above may be formed on the inner peripheral surface of the operating ring 101, and the grounded portions 101e may be formed at locations adjacent to the groove portions 101a in the direction of the optical axis. This makes the operating ring 101 movable in the direction of the optical axis to switch between the presence and absence of a click feel.

Moreover, the object that moves in the direction of the optical axis should not necessarily be the operating ring 101. For example, the urging metal sheet 110 and the steel ball 111 may be moved in the direction of the optical axis, and a part of the steel ball 111 which abuts against the operating ring 101 may be switched to the groove portions 101a or the grounded portions 101e.

Furthermore, although in the second embodiment, the reflective photo sensors (photo reflectors) are used for an optical encoder that detects rotation, for example, translucent photo interrupters may be used.

Thus, in the second embodiment of the present invention, rotations of the operating ring (rotary ring) provided on the outer periphery of the lens barrel are stably detected.

A description will now be given of a digital camera (hereafter referred to as the camera) 1000 which is an image pickup apparatus on which a lens adaptor and an interchangeable lens according to a third embodiment of the present invention can be mounted. In the following description of the third embodiment, elements common with or similar to those of the first and second embodiments are designated by the same reference symbols or remarked as such, and detailed description thereof is omitted sometimes.

Figure 10A:
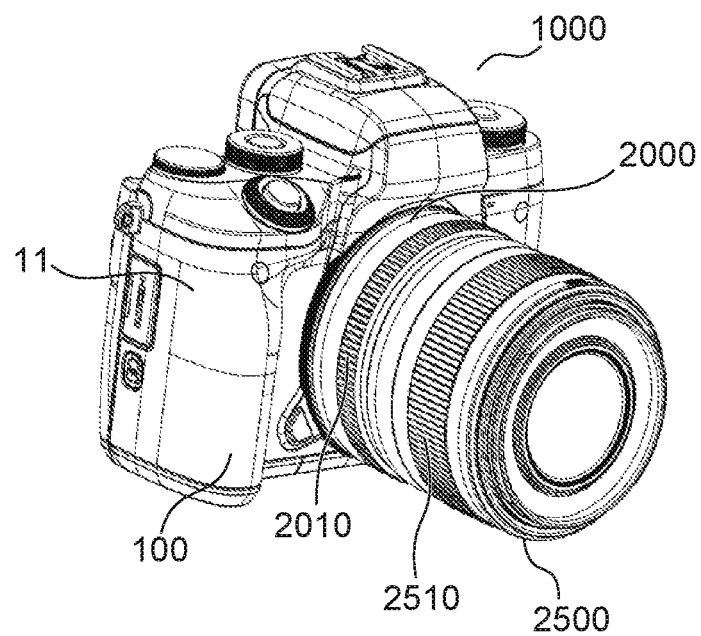
FIGS. 10A and 10B are views showing an example of an image pickup apparatus equipped with a lens adaptor according to a third embodiment of the present invention.
Figure 10B:
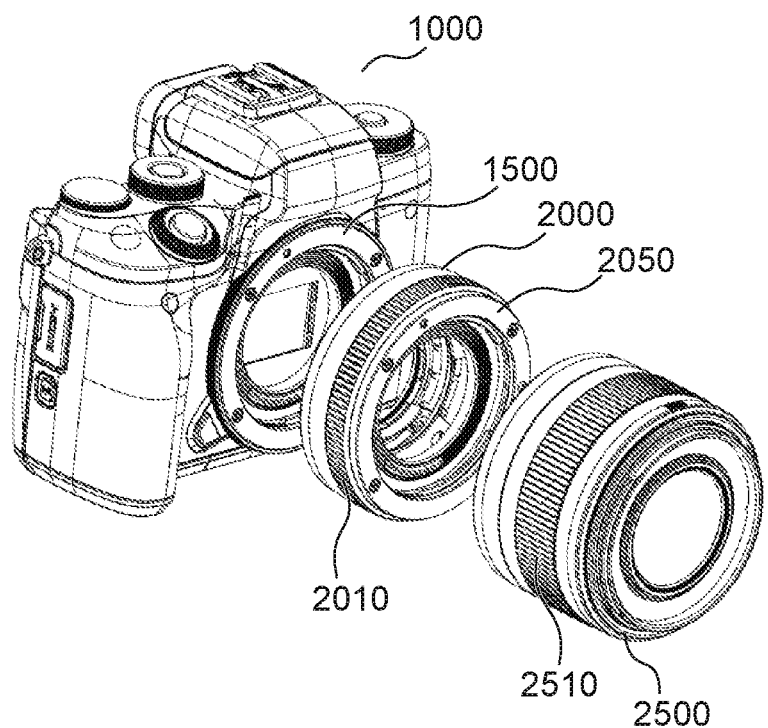

FIGS. 10A and 10B are perspective views of the camera 1000, the lens adaptor (accessory device) 2000, and the interchangeable lens (optical device) 2500 as seen from front (subject side) in the direction of the optical axis. FIG. 10A is a view showing a lens mounted state in which the lens adaptor 2000 is mounted on the camera 1000, and the interchangeable lens 2500 is mounted on the lens adaptor 2000. FIG. 10B is a view showing a lens demounted state in which the camera 1000, the lens adaptor 2000, and the interchangeable lens 2500 are separated from one another.

As shown in FIG. 10B, a mounting unit 1500 is provided in a middle part of the camera 1000 on its front side. A converting adaptor (lens adaptor) for mounting the interchangeable lens and other interchangeable lenses with different specifications on the camera 1000 can be mounted on the mounting unit 1500.

In the present embodiment, the lens adaptor 2000 is mounted on the mounting unit 1500. By mounting the lens adaptor 2000 on the mounting unit 1500, the interchangeable lens 2500 that cannot be directly mounted on the mounting unit 1500 can be used in the camera 1000.

An adaptor operating ring (rotating member, rotary ring) 2010 is placed on an outer periphery of the lens adaptor 2000. As with the operating ring 101 of the embodiments described above, the photographer can assign an arbitrary function for changing shooting conditions to the adaptor operating ring 2010. For example, the photographer can change shooting conditions such as a focal position and an exposure value by rotating the adaptor operating ring 2010.

The lens adaptor 2000 is equipped with a lens mounting unit 2050 on which the interchangeable lens 2500 is to be mounted. In the present embodiment, as shown in FIG. 10A, the lens adaptor 2000 is mounted on the camera 1000, and the interchangeable lens 2500 is mounted on the lens adaptor 2000. Namely, the interchangeable lens 2500 is mounted on the camera 1000 via the lens adaptor 200).

A lens operating ring (rotating member, rotary ring) 2510 is placed on an outer periphery of the interchangeable lens adaptor 2500. As with the operating ring 2010 of the above described embodiments and the adaptor operating ring 2010 mentioned above, the photographer can assign an arbitrary function for changing shooting conditions to the adaptor operating ring 2510.

As described above, in the state where the interchangeable lens 2500 is mounted on the lens adaptor 2000, they are equipped with the respective rotary rings that are rotatable. By assigning different functions to the operating rings 2010 and 2510, a variety of detailed settings for shooting can easily be changed.

According to the arrangement described above, the interchangeable lens 2500 is mounted on the camera 1000 via the lens adaptor 2000. The present embodiment, however, is not limited to the arrangement described above, but an interchangeable lens may be directly mounted on the mounting unit 1500 of the camera 1000.

The adaptor operating ring 2010, which is provided on the lens adaptor 2000, and the lens operating ring 2510, which is provided on the interchangeable lens adaptor 2500, have the same arrangement as that of the operating ring 101 in the first and second embodiments described above. A description thereof is given below.

The click mechanisms are provided on an inner side of the adaptor operating ring 2010 and an inner side of the lens operating ring 2510. The click mechanisms urge the operating rings 2010 and 2510 toward their outer peripheries from their rotational axes and provide a click feel when the adaptor operating ring 2010 or the lens operating ring 2510 is rotated.

The pattern 101b is each provided in an inner peripheral portion of the adaptor operating ring 2010 and an inner peripheral portion of the lens operating ring 2510. The lens adaptor 2000 and the interchangeable lens 2500 are equipped with the photo sensors (rotation detecting members) 120a and 120b.

The click mechanisms and the photo sensors 120a and 120b are placed in the same way as in the arrangement of the first embodiment described above with reference to FIG. 7. According to the arrangement described above, rotating operations of the operating ring (rotary ring) provided on the outer periphery of the lens barrel for the interchangeable lenses or the outer periphery of the lens adaptor are detected in a stable manner.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-177491, filed Sep. 21, 2018, and Japanese Patent Application No. 2019-123146, filed Jul. 1, 2019, which are hereby incorporated by reference herein in their entireties.

What is claimed is:

1. An image pickup apparatus comprising:
   a rotary ring being provided on an outer periphery of a lens barrel;
   a holding member being provided on an inner periphery of the rotary ring and holding the rotary ring;
   a rotation detecting member detecting a rotation direction and a rotation amount of the rotary ring when the rotary ring has been rotated; and
   an urging member urging the rotary ring against the holding member in an urging direction perpendicular to a rotational axis of the rotary ring,
   wherein a detecting direction of the rotation detecting member and the urging direction of the urging member are parallel to each other, when viewed from a direction of an optical axis of the lens barrel,
   wherein the rotation detecting member is a photo sensor comprising a light emitting unit and a light receiving unit, and
   the detecting direction of the rotation detecting member is a direction of a light bundle output from the light emitting unit or a direction of a light bundle falling upon the light receiving unit, and
   wherein, when viewed from the direction of the optical axis, the rotation detecting member and the urging member are arranged facing each other with the rotational axis as a center thereof.

2. The image pickup apparatus according to claim 1, wherein a rotation detecting pattern for the rotation detecting member to detect the rotation direction and the rotation amount of the rotary ring is formed on the inner periphery of the rotary ring; and
   the urging member urges the rotary ring from inside the lens barrel toward outside the lens barrel.

3. The image pickup apparatus according to claim 1, wherein
   a plurality of groove portions is formed at regular intervals in a circumferential direction of the inner periphery of the rotary ring, and
   the urging member abuts against the groove portions and urges the rotary ring in the urging direction perpendicular to a direction of the rotational axis.

4. The image pickup apparatus according to claim 3, comprising a click mechanism that repeatedly and alternately switches between a state in which the urging member abuts against the groove portions and the urging member does not abut against the groove portions when the rotary ring is rotated.

5. The image pickup apparatus according to claim 1, wherein
   a groove portion against which the urging member abuts to provide a click feel when the rotary ring is rotated, and a grounded portion that does not provide the click feel are formed on the inner periphery of the rotary ring, and
   the urging member urges the rotary ring in a direction that intersects a direction of the rotational axis.

6. The image pickup apparatus according to claim 1, further comprising:
   a click mechanism that includes the urging member and groove portions formed in the inner periphery of the rotary ring to be arranged in a circumferential direction of the inner periphery, and repeatedly and alternately switches between a state in which the urging member abuts against one of the groove portions and a state in which the urging member does not abut against the groove portions, when the rotary ring is rotated while being urged by the urging member in a direction intersecting the rotational axis, wherein the holding member includes a fitting portion having a cylindrical shape, and the fitting portion has an outer periphery on which the rotary ring is fitted and an inner periphery on which a cut is formed, wherein, in the click mechanism, the urging member includes an urging metal sheet with springiness, in which an opening is formed, and a ball engaged with the opening of the urging metal sheet and urged by the urging metal sheet in a direction from inside the lens barrel toward outside the lens barrel, and the ball repeatedly and alternately switches between a first state in which the ball abuts against one of the groove portions and a second state in which the ball does not abut against the groove portions when the rotary ring is rotated, wherein the urging metal sheet is placed in the cut of the fitting portion, and the ball abuts against one of the groove portions through a through portion formed in the cut in the first state, and wherein, when viewed from the direction of the optical axis, the photo sensor and the click mechanism are arranged facing each other with the rotational axis as a center thereof, and a detecting direction of the photo sensor and an urging direction of the urging metal sheet are parallel to each other.

7. An optical device comprising:
a lens barrel being detachably attachable from an image pickup apparatus;
a rotary ring being provided on an outer periphery of the lens barrel;
a holding member being provided on an inner periphery of the rotary ring and holding the rotary ring;
a rotation detecting member detecting a rotation direction and a rotation amount of the rotary ring when the rotary ring has been rotated; and
an urging member urging the rotary ring against the holding member in an urging direction perpendicular to a rotational axis of the rotary ring,
wherein a detecting direction of the rotation detecting member and the urging direction of the urging member are parallel to each other, when viewed from a direction of an optical axis of the lens barrel,
wherein the rotation detecting member is a photo sensor comprising a light emitting unit and a light receiving unit, and
the detecting direction of the rotation detecting member is a direction of a light bundle output from the light emitting unit or a direction of a light bundle falling upon the light receiving unit, and
wherein, when viewed from the direction of the optical axis, the rotation detecting member and the urging member are arranged facing each other with the rotational axis as a center thereof.

8. The optical device according to claim 7, wherein
a rotation detecting pattern for the rotation detecting member to detect the rotation direction and the rotation amount of the rotary ring is formed on the inner periphery of the rotary ring; and
the urging member urges the rotary ring from inside the lens barrel toward outside the lens barrel.

9. The optical device according to claim 7, wherein a plurality of groove portions is formed at regular intervals in a circumferential direction of the inner periphery of the rotary ring, and
the urging member abuts against the groove portions and urges the rotary ring in the urging direction perpendicular to a direction of the rotational axis.

10. The optical device according to claim 9, comprising a click mechanism that repeatedly and alternately switches between a state in which the urging member abuts against the groove portions and the urging member does not abut against the groove portions when the rotary ring is rotated.

11. The optical device according to claim 7, wherein a groove portion against which the urging member abuts to provide a click feel when the rotary ring is rotated, and a grounded portion that does not provide the click feel are formed on the inner periphery of the rotary ring, and
the urging member urges the rotary ring in a direction that intersects a direction of the rotational axis.

12. The optical device according to claim 7, further comprising:
a click mechanism that includes the urging member and groove portions formed in the inner periphery of the rotary ring to be arranged in a circumferential direction of the inner periphery, and repeatedly and alternately switches between a state in which the urging member abuts against one of the groove portions and a state in which the urging member does not abut against the groove portions, when the rotary ring is rotated while being urged by the urging member in a direction intersecting the rotational axis,
wherein the holding member includes a fitting portion having a cylindrical shape, and the fitting portion has an outer periphery on which the rotary ring is fitted and an inner periphery on which a cut is formed,
wherein, in the click mechanism, the urging member includes an urging metal sheet with springiness, in which an opening is formed, and a ball engaged with the opening of the urging metal sheet and urged by the urging metal sheet in a direction from inside the lens barrel toward outside the lens barrel, and
the ball repeatedly and alternately switches between a first state in which the ball abuts against one of the groove portions and a second state in which the ball does not abut against the groove portions when the rotary ring is rotated,
wherein the urging metal sheet is placed in the cut of the fitting portion, and the ball abuts against one of the groove portions through a through portion formed in the cut in the first state, and
wherein, when viewed from the direction of the optical axis, the photo sensor and the click mechanism are arranged facing each other with the rotational axis as a center thereof, and a detecting direction of the photo sensor and an urging direction of the urging metal sheet are parallel to each other.

13. An accessory device comprising:
a lens adapter being detachably attachable from an image pickup apparatus and on which a lens barrel is mountable;
a rotary ring being provided on an outer periphery of the lens adapter;
a holding member being provided on an inner periphery of the rotary ring and holding the rotary ring;
a rotation detecting member detecting a rotation direction and a rotation amount of the rotary ring when the rotary ring has been rotated; and an urging member urging the rotary ring against the holding member in an urging direction perpendicular to a rotational axis of the rotary ring, wherein a detecting direction of the rotation detecting member and the urging direction of the urging member are parallel to each other, when viewed from a direction of an optical axis of the lens barrel, wherein the rotation detecting member is a photo sensor comprising a light emitting unit and a light receiving unit, and the detecting direction of the rotation detecting member is a direction of a light bundle output from the light emitting unit or a direction of a light bundle falling upon the light receiving unit, and wherein, when viewed from the direction of the optical axis, the rotation detecting member and the urging member are arranged facing each other with the rotational axis as a center thereof.

14. The accessory device according to claim 13, wherein a rotation detecting pattern for the rotation detecting member to detect the rotation direction and the rotation amount of the rotary ring is formed on the inner periphery of the rotary ring; and the urging member urges the rotary ring from inside the lens barrel toward outside the lens barrel.

15. The accessory device according to claim 13, wherein a plurality of groove portions is formed at regular intervals in a circumferential direction of the inner periphery of the rotary ring, and the urging member abuts against the groove portions and urges the rotary ring in the urging direction perpendicular to a direction of the rotational axis.

16. The accessory device according to claim 15, comprising a click mechanism that repeatedly and alternately switches between a state in which the urging member abuts against the groove portions and the urging member does not abut against the groove portions when the rotary ring is rotated.

17. The accessory device according to claim 13, wherein a groove portion against which the urging member abuts to provide a click feel when the rotary ring is rotated, and a grounded portion that does not provide the click feel are formed on the inner periphery of the rotary ring, and the urging member urges the rotary ring in a direction that intersects a direction of the rotational axis.

18. The accessory device according to claim 13, further comprising:

a click mechanism that includes the urging member and groove portions formed in the inner periphery of the rotary ring to be arranged in a circumferential direction of the inner periphery, and repeatedly and alternately switches between a state in which the urging member abuts against one of the groove portions and a state in which the urging member does not abut against the groove portions, when the rotary ring is rotated while being urged by the urging member in a direction intersecting the rotational axis, wherein the holding member includes a fitting portion having a cylindrical shape, and the fitting portion has an outer periphery on which the rotary ring is fitted and an inner periphery on which a cut is formed, wherein, in the click mechanism, the urging member includes an urging metal sheet with springiness, in which an opening is formed, and a ball engaged with the opening of the urging metal sheet and urged by the urging metal sheet in a direction from inside the lens barrel toward outside the lens barrel, and the ball repeatedly and alternately switches between a first state in which the ball abuts against one of the groove portions and a second state in which the ball does not abut against the groove portions when the rotary ring is rotated, wherein the urging metal sheet is placed in the cut of the fitting portion, and the ball abuts against one of the groove portions through a through portion formed in the cut in the first state, and wherein, when viewed from the direction of the optical axis, the photo sensor and the click mechanism are arranged facing each other with the rotational axis as a center thereof, and a detecting direction of the photo sensor and an urging direction of the urging metal sheet are parallel to each other.

* * * * *